Sept. 4, 1962 R. D. HYDE 3,052,500
COMBINATION TABLE SEAT AND VEHICLE SEAT FOR
BABIES AND SMALL CHILDREN
Filed May 1, 1961 2 Sheets-Sheet 2
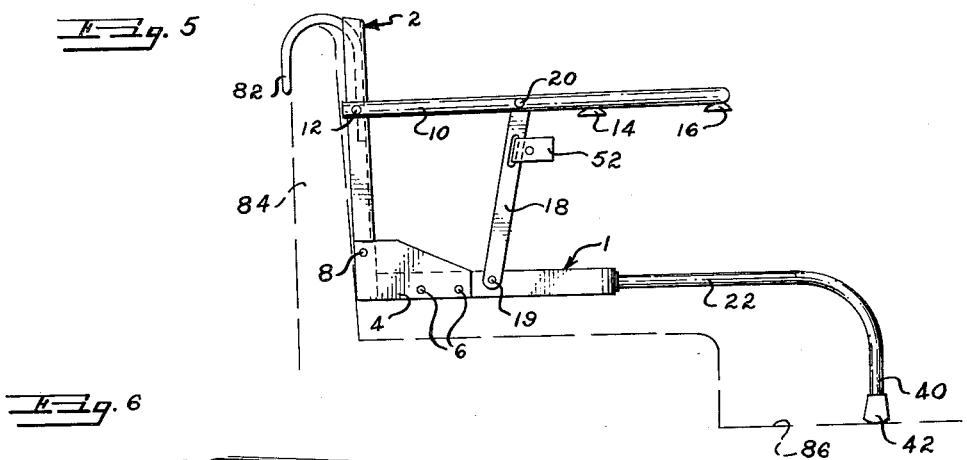
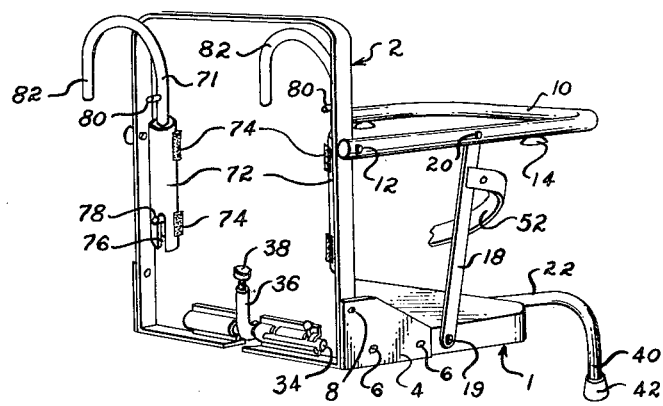
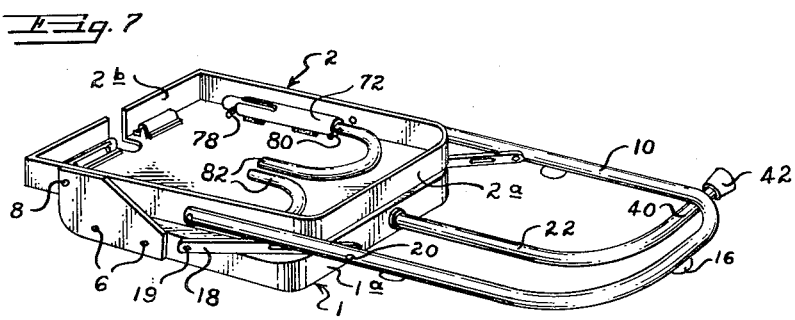
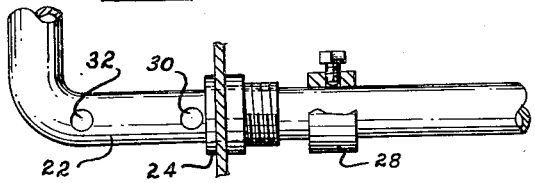
ROBERT D. HYDE
INVENTOR.
BY
Wayland D. Keith
HIS AGENT 3,052,500
Patented Sept. 4, 1962

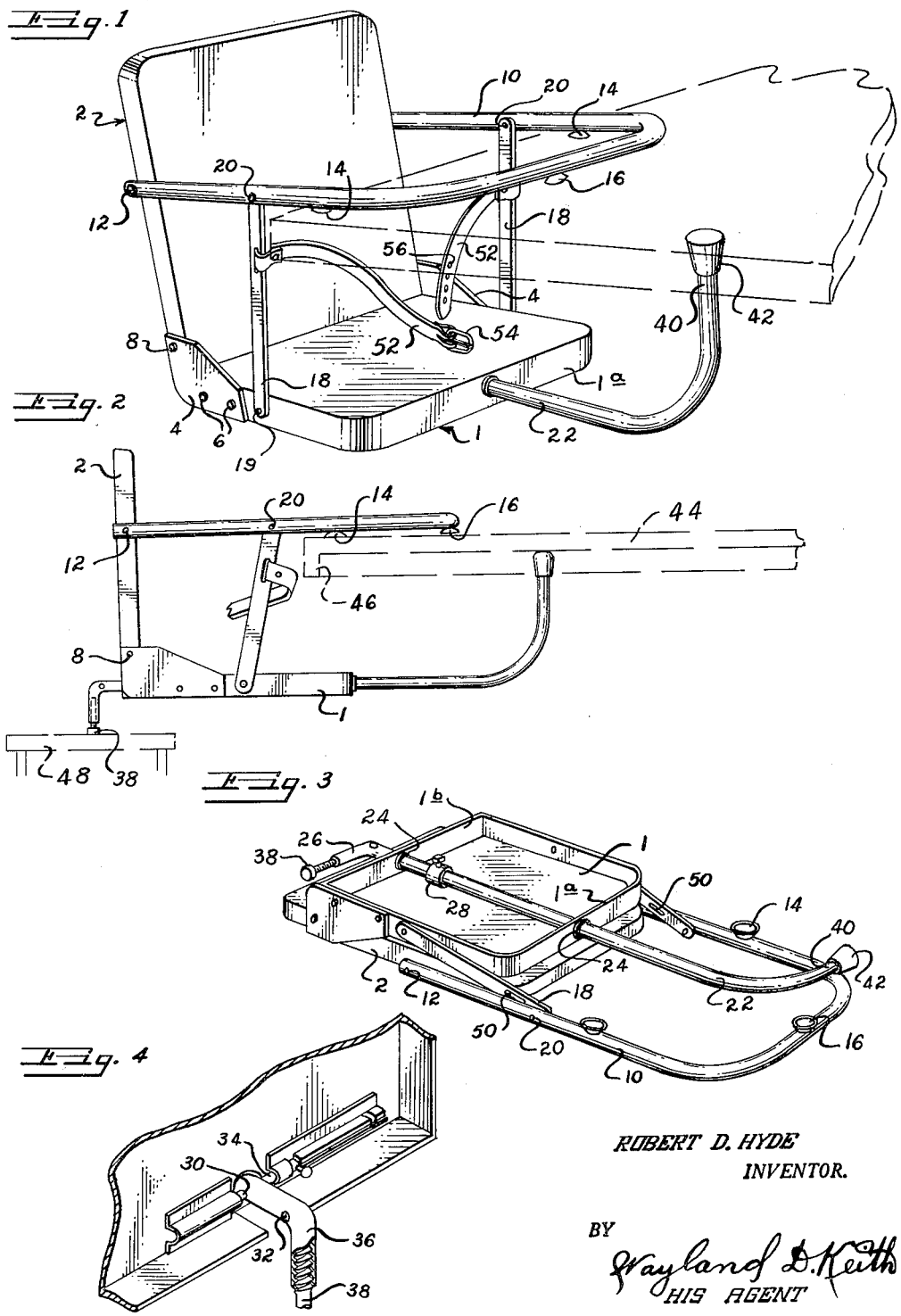

3,052,500
COMBINATION TABLE SEAT AND VEHICLE SEAT FOR BABIES AND SMALL CHILDREN
Robert D. Hyde, 1666 Dayton St., Wichita Falls, Tex.
Filed May 1, 1961, Ser. No. 106,922
4 Claims. (Cl. 297—130)

This invention relates to improvements in baby seats and more particularly to a combination table seat and vehicle seat for babies or small children.

Various seats have been proposed heretofore for seating babies at tables and for seating babies in automotive vehicles. The present seat can be used either on a table or in an automotive vehicle. The present arrangement enables a single seat to fill two needs, and when travelling enables the seat to be used to seat the baby in the vehicle and when food is served enables the baby to be seated at the table without having to provide a separate and independent seat therefor.

Furthermore, the present seat is readily collapsible to enable the folding thereof into a minimum of space for shipment or storage. It is preferable to make the device of light weight metal, or partly of metal and partly of plastic, or of fiberglass with certain parts made of metal, thereby the cost of manufacture may be kept to a minimum yet provide a serviceable, utilitarian seat.

An object of this invention is to provide a combination vehicle seat and table seat for a baby without the necessity of adding axiliary parts thereto.

Another object of the invention is to provide a seat for a baby which is readily collapsible when not in use, and which folds into a comparatively small package for storage and shipment.

Still another object of the invention is to provide a baby seat which is sturdy in construction, light in weight, and which may be readily handled either with or without the baby therein.

Still a further object of the invention is to provide a collapsible baby seat which is self-supporting on a table.

Still another object of the invention is to provide a baby seat which may be partly self-supporting on the table and which may be partly supported by a support element.

Another object of the invention is to provide a baby seat that is simple in construction, low in cost of manufacture, and which requires a minimum of maintenance.

With these objects in mind and others which will become manifest as the description proceeds, reference is to be had to the accompanying drawings in which like reference characters designate like parts in the several views thereof.

In the drawings:

FIG. 1 is a perspective view of the baby seat attached to a table, the seat being shown in full outline, and the table being shown in dashed outline;

FIG. 2 is a side elevational view of the baby seat attached to a table, the seat being shown in full outline and the table being shown in dashed outline, and showing a stool in dashed outline in position to support the back of the baby seat to provide a safety element therefor;

FIG. 3 is a perspective view of the baby seat shown in collapsible condition and showing the support bar pasing therethrough;

FIG. 4 is an enlarged fragmentary, perspective view of the rear portion of the seat showing the slide bolt locking mechanism therefor, with parts broken away and shown in section to bring out the details of construction;

FIG. 5 is an elevational view of the baby seat attached to a vehicle seat, with the seat being shown in full outline and with the vehicle seat and the floor thereof being shown in dashed outline;

FIG. 6 is a perspective view of the baby seat in position to be attached to a vehicle seat and showing the support member arranged in position to support the front portion of the baby seat on the car floor;

FIG. 7 is a view similar to FIG. 3, but showing the opposite side thereof, showing the car seat engaging hooks in folded position, and showing the belts removed therefrom; and FIG. 8 is an enlarged fragmentary, elevational view of the support member in place on the seat, with parts broken away and shown in section to bring out the details of construction.

With more detailed reference to the drawings the numeral 1 designates generally the bottom portion of the seat and the numeral 2 designates the back portion of the seat. A brace member 4 is secured to each side of the bottom portion 1 by fasteners 6, such as rivets or the like. The back portion 2 is pivotally secured to the brace 4 by pivot members 8 so that the back portion may be moved from the position as shown in FIGS. 1, 2, 5, and 6 to the positions as shown in FIGS. 3 and 7. A forwardly extending loop member 10 is secured, by a pivot member 12, to each side of the back portion 2 and has a resilient cup 14 on the lower portion of each side thereof a spaced distance outward from the back portion or member 2. A further resilient cup 16 is secured on the forward edge of loop member 10, which resilient cups are preferably of the vacuum type so, when fixed in place, they will resist movement on a non-porous surface. A brace member 18 is pivotally mounted on each side of the bottom member 1 by a pivot member 19 forwardly of brace members 4, which brace members 20 which are in the form of rivets, bolts or the like. The spacing between the pivot members 8, 12, 19, and 20 is such that, when the top of the back 2 of the seat is moved about pivots 8, the brace member 18 and loop member 10 will move in co-ordination into a compact folded unit, as shown in FIGS. 3 and 7.

A support member 22 extends through the bottom flanged portions 1a and 1b of the bottom portion 1 and is journaled in bushings 24 fitted on the opposite sides of the flanges 1a and 1b, so that the support member 22, which passes therethrough, is free to turn within bushings 24, and which support member 22 will slide within the limitation between downturned support leg 26 and a set collar 28 secured on support member 22. The set collar 28 is secured to support member 22 to limit the longitudinal movement of the support member, but at the same time will permit the support member to move longitudinally to enable transverse holes 30 and 32 to come into register with a slide bolt plunger 34, which is mounted on the rear portion of the back 2. The rear portion of support member 22 has a downturned leg 36 which is screwthreaded internally or has an internally screwthreaded bushing fitted therein, as will best be seen in FIG. 4, so as to threadably receive a screwthreaded bolt 38, as will best be seen in FIGS. 2, 3, and 4. The downturned leg portion 36 prevents endwise movement of support member 22 in one direction and when used in conjunction with a table the downturned support leg 36 extends downward to rest on stool or chair 48 and is locked in place by slide bolt plunger 34, as will best be seen in FIGS. 2 and 4.

The opposite end of support member 22 extends a substantial distance forward of the forward edge of bottom portion 1 of the seat, and is turned through approximately ninety degrees so the distal end thereof will face in an opposite direction from the end of downturned leg 36. An elastomer cushioned cup member 42 is fitted on the end thereof which, when used with a table as indicated at 44, will abridge the downturned ledge 46 of the table so as to put elastomer cup members 14 in position to impress weight downwardly thereon, with the distal end of support member 22 extending upward beneath the table so as to limit the downward movement of the rear portion of the seat. In this manner the seat is normally prevented from tipping downward. However, the stool or the like, as indicated at 48, is positioned beneath screwthreaded member 38 to act as a safety element should the baby seat be inadvertently moved off of the edge of the table.

The upright braces 18 are slotted intermediate the lengths thereof, as indicated at 50, to receive complementary strap members 52, one of which strap members has a buckle or fastening clip thereon as indicated at 54, while the other portion of the belt is perforated as indicated at 56. Normally for table service the belt members 52 are not utilized, but may be, if so desired.

*Connecting Baby or Child's Seat to a Table*

With the seat in folded position as shown in FIG. 3, the back portion 2 is moved about pivots 8 on brace 4 so as to make the seat move through a substantially right angle into the position as shown in FIGS. 1 and 2. The support member 22 is moved from the position as shown in FIG. 3 to that shown in FIGS. 1, 2, and 4 and the slide bolt 34 is moved into position as shown in FIG. 4 so that the plunger will move through hole 30 to lock the support member 22 in a fixed relation with respect to the back of the seat 2. The child's seat then may be deftly fitted over the edge of the table until elastomer cup members 34 are in the desired spaced relation with respect to the edge of the table, then the child is placed in the seat, whereupon weight of the child will cause downward movement to be exerted on elastomer cup members 14.

However, since the distal end 40 of the support member 22 is forward of elastomer cup member 14, the weight exerted on the bottom portion 1 of the seat will cause an upward movement of the distal end 40 with the elastomer cup member 42 engaging the underside of the table. This is normally secure, and unless the seat should push backwards sufficiently to disengage the cups 14 from the edge of the table, no danger of falling is encountered. However, as a precautionary safety measure a chair or stool 48 may be placed under downwardly extending leg member 36 and a screwthreaded member 38 adjusted against the chair or stool until the screw threaded member 38 is in engagement with the upper surface of chair or stool 48.

*Seat Modified for Use in Motor Vehicles*

The form of the seat as shown in FIGS. 5 through 8 embodies the same seat as that shown in FIGS. 1 through 4; however on the rear side of the back portion 2 a pair of tubular members 71 is fitted within the respective members 72, one of which tubular members is secured near each side of rear of seat back 2 as, by welding, as indicated at 74. Tubular members 72 are parallel and are preferably slotted, as indicated at 76, on the respective lower ends thereof to receive pins 78 therethrough, when in the position as shown in FIG. 6, so as to hold the tubular members 71 of the baby seat against pivotal movement. A further pin 80 is positioned in each of the members 71 a sufficient distance above the tubular member 72 so when the tubular members 71 are telescoped, the hooks 82 formed thereon may be moved from the position as shown in FIGS. 5 and 6 to the position as shown in FIG. 7 so that the hooks will not extend outward from the surface of flanges 2a and 2b.

*Attachment of Baby Seat to a Vehicle Seat*

When it is desired to attach the baby seat to a vehicle seat as shown in FIG. 5, the out-turned hooks 82 are turned from the position as shown in FIG. 7 to that shown in FIG. 6, and moved upward until pins 78 engage slots 76, whereupon the tubular members 71 are locked against pivotal movement. The support member 22 is then moved from the position as shown in FIG. 7 to that shown in FIGS. 5 and 6, and the slide bolt 34 is moved longitudinally through hole 32 in support member 22. This will lock the support member 22 against relative turning movement with respect to the bottom 1 and back 2. This will also hold the support leg 36 in close fitting relation within the confines of flanges 2a and 2b, so when the back portion of the baby seat is fitted against the seat 84 of an automobile, no damage will be done to the upholstery by the support leg 36 and the distal end 40 of support member 22 will extend downward into seating relation with floor 86 of the vehicle.

With the baby seat thus connected to the vehicle seat the baby or child may ride in comfort, and to insure safety, the belt portions 52 may be secured together by a buckle 54.

When it is no longer desired to use the baby seat supported on the vehicle seat 84, the tubular members 71 are moved downward to disengage pins 78 from slot 76 and the hooks 82 are moved toward each other through a ninety degree arc so as to fold flat against the rear face of the back portion 2 of the baby seat; then by moving slide bolt 34 out of engagement with hole 32 the support member 22 may be rotated about the longitudinal axis thereof through approximately ninety degrees into the positions as shown in FIGS. 3 and 7, and then by pivoting the back portion 2 about pivot 8 the back and bottom portion of the seat may be moved in substantially parallel relation as shown in FIG. 7 to enable the baby seat to be carried in a minimum of space.

Having thus clearly shown and described this invention, what is claimed as new and desired to be secured by Letters Patent is:

1. A baby seat for use in a motor vehicle, which seat has a bottom portion and a back portion, said portions being pivotally connected near the adjacent edges thereof for movement through substantially ninety degrees, an outwardly extending loop portion pivotally connected to the back portion intermediate the height thereof, a brace pivotally connected to said bottom portion and extending upwardly therefrom and being pivotally connected to the outwardly extending loop portion intermediate the length thereof, a pair of elongated, upright members mounted on the rear face of said back portion to pivot about the respective upright axes, which upright members have re-entrant portions forming hooks on the upper ends thereof, which hooks are adapted to engage the back portion of an automobile seat when in outwardly extending position and to pivot into engagement with the rear face of said back portion when in another position, and said upright members being slidable longitudinally with respect to said back portion so as to lie within the confines of said back of said seat when said upright members are in one position.

2. A baby seat for use with a motor vehicle as defined in claim 1; wherein a further support member extends through the bottom portion of said seat to a point forward thereof and being downturned so as to engage the floor surface of a motor vehicle, and latch means adapted to hold said support member in fixed relation with respect to said bottom portion of said seat.

3. A baby seat for use with a motor vehicle as defined in claim 1; wherein pin and slot lock means is provided on the rear face of said back portion to secure said elongated, upright members against pivotal movement when said hooks are in outwardly extending position.

4. A baby seat for use with a table, which seat has a bottom portion and a back portion, said portions being pivotally connected together near the adjacent edges thereof for movement through substantially ninety degrees, an outwardly extending loop portion pivotally connected to the back portion intermediate the height thereof, a brace pivotally connected to said bottom portion and extending upward therefrom and being pivotally connected to the outwardly extending loop portion intermediate the length thereof, a support member extending through the bottom portion of said seat to a point forward of said loop portion and being upturned so as to engage the lower surface of the top of a table, resilient means on said loop portion intermediate the outwardly extending length thereof to form a bearing support upon application of weight to said bottom portion, a slide bolt mounted on the rear surface of said back portion, and said support member being transversely apertured adjacent said back portion so said slide bolt will register with said transverse aperture in said support member so said upturned portion of said support member will be held in upright position when said slide bolt is in engagement with said aperture in said support member.

References Cited in the file of this patent

UNITED STATES PATENTS

| | | |
|---|---|---|
| Re. 23,339 | Ducey | Feb. 13, 1951 |
| 2,697,477 | Welsh | Dec. 21, 1954 |
| 2,707,987 | Gibson | May 10, 1955 |
| 2,764,222 | Berlin | Sept. 25, 1956 |
| 2,895,537 | Davidson | July 21, 1959 |
| 2,956,617 | Bruderer et al. | Oct. 18, 1960 |

FOREIGN PATENTS

| | | |
|---|---|---|
| 59,043 | Netherlands | Mar. 15, 1947 |